No. 798,291. PATENTED AUG. 29, 1905.
W. NIEBUR, Jr.
APPARATUS FOR CUTTING PLASTIC MATERIAL.
APPLICATION FILED JAN. 13, 1905.
2 SHEETS—SHEET 1.
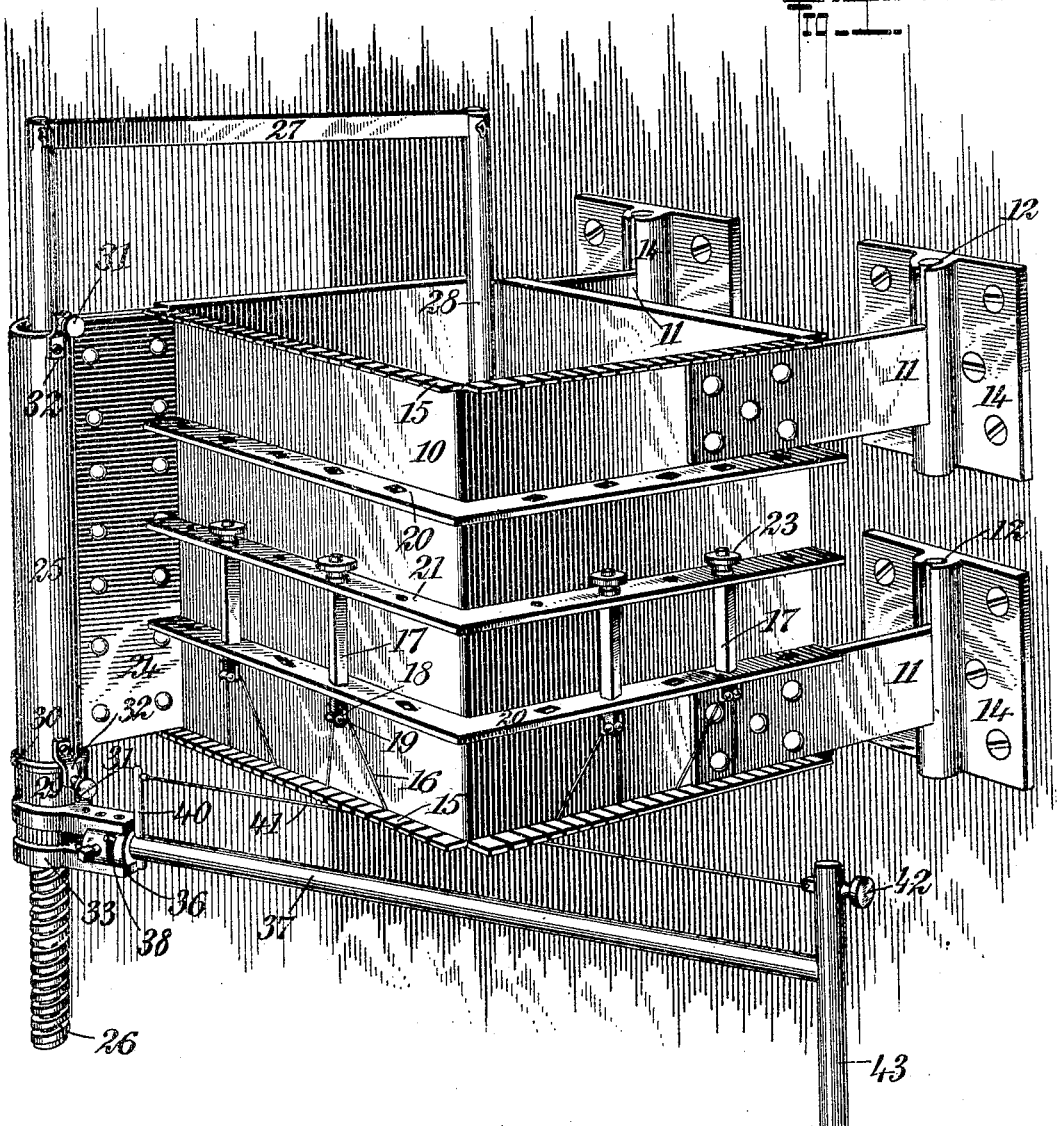
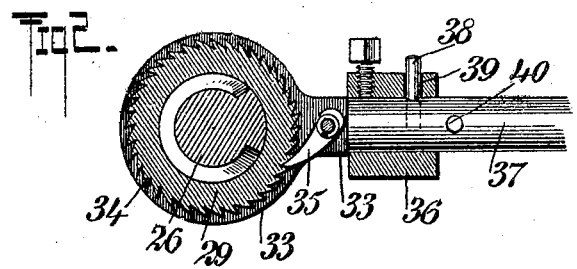
WITNESSES:
Geo. B. Kingsbury
Isaac B. Owens.
INVENTOR
William Niebur Jr.
BY
ATTORNEYS

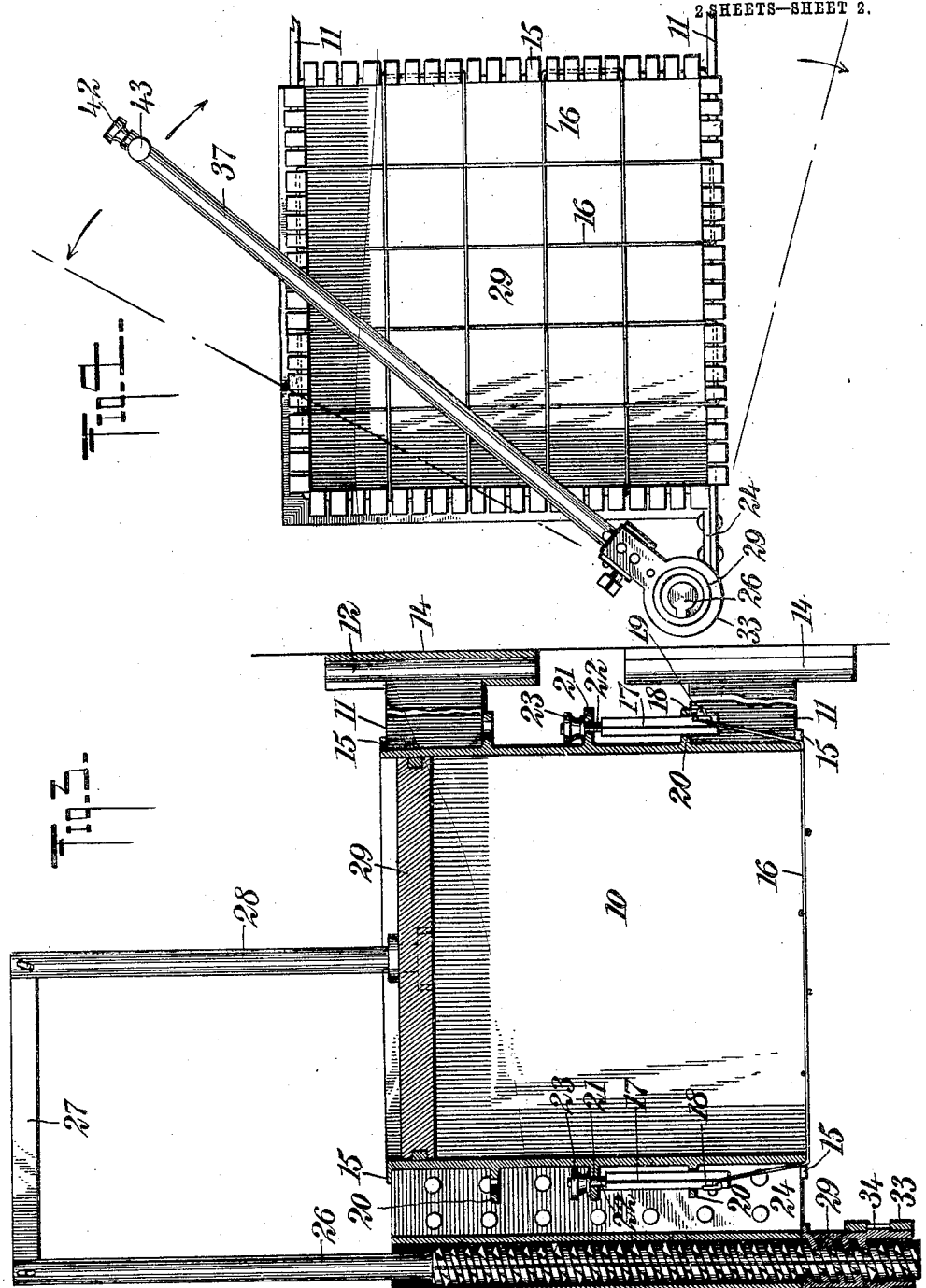

UNITED STATES PATENT OFFICE.

WILLIAM NIEBUR, JR., OF NEW YORK, N. Y.

APPARATUS FOR CUTTING PLASTIC MATERIAL.

No. 798,291.     Specification of Letters Patent.     Patented Aug. 29, 1905.

Continuation of application Serial No. 200,973, filed March 31, 1904. This application filed January 13, 1905. Serial No. 240,901.

*To all whom it may concern:*

Be it known that I, WILLIAM NIEBUR, Jr., a citizen of the United States, and a resident of the city of New York, borough of Manhattan, in the county of New York and State of New York, have invented a new and Improved Apparatus for Cutting Plastic Material, of which the following is a full, clear, and exact description.

The invention relates to a device for cutting plastic material into blocks or cakes.

It is especially intended for cutting small cakes of butter from a large mass, and by means of my invention cakes of any size may be rapidly cut without handling the cakes in any way. This is a decided advantage over the devices heretofore commonly employed for the purpose, since when the small cakes are formed handling of the cakes may tend seriously to misshape the cakes of butter.

The present application is a continuation of my copending application filed March 31, 1904, Serial No. 200,973.

Reference is to be had to the accompanying drawings, which illustrate, as an example, the preferred embodiment of the invention, in which drawings like characters of reference indicate like parts in the several views, and in which—

Figure 1 is a perspective view showing the invention in use. Fig. 2 is a detail section illustrating the operating-arm and ratchet. Fig. 3 is a vertical section of the device, and Fig. 4 is a bottom plan view.

The apparatus comprises a receptacle 10, which is preferably of metal and rectangular in form, as shown. This receptacle may be supported in any desired manner, either vertically or horizontally. As here shown, it is provided with four lugs 11, having vertical pins 12 at their ends, these lugs being adapted to engage suitable holders 14, attached to a vertical wall. If desired, however, the device may be clamped horizontally onto a table or other equivalent support. The ends of the receptacle are turned over to form flanges 15, and these flanges are formed with notches therein, as shown. Both ends of the receptacle are flanged and notched to enable the device to be turned end for end, as desired; but only one set of the flanges is used at a time. These notched flanges 15 are intended to properly hold and space the wires 16, which extend across the discharge end of the receptacle 10 and cross each other to form squares, said wires serving to cut the butter into square sticks, which are in turn cut into parts to form the cakes, which will be hereinafter described. It is clear that by adjusting the wires 16 and increasing or diminishing their number the size of the cakes may be varied at will. The wires 16 are held and their tension readily regulated by means of bars 17, having hooks 18 at their lower ends. These hooks are adapted to be engaged by balls 19, of lead or other equivalent material, formed on or fastened to the ends of the wires 16. Said bars are mounted in guide-flanges 20 and 21. As here shown, there are three of these flanges, two numbered 20 and the middle one 21. Three are provided to enable the bars to be shifted so as to hold the wires at one end or the other of the receptacle 10. Only two of the flanges, however, are active at one time. The flanges 20 are formed with square orifices and the bars 17 are squared to slidably fit therein. The upper ends of the bars, as best shown in Fig. 3, are formed with reduced portions 22, which fit in round orifices in the flange 21. Said reduced portions 22 are threaded and nuts 23 operate thereon. These nuts bear against the flange 21, and by means of the nuts the bars 17 may be moved to tighten or relax the wires 16. Said bars may also be shifted from the position shown in Fig. 1 to a position in which they engage the upper flange 20 and the flange 21, thus permitting the wires to be placed on the upper end of the receptacle 10.

Projecting from the receptacle 10 is a suitable bracket 24, formed with a sleeve 25 at its outer edge, this sleeve running parallel with the receptacle 10. Extending through said sleeve is a screw 26, to the upper end of which an arm 27 is removably or permanently connected in any desired way. Said arm projects over the receptacle 10 and is connected with the stem 28 of a plunger 29. This plunger moves into the receptacle and is adapted to press down on the butter or other plastic material, extruding it from the lower end and between the wires 16. Coacting with the lower end of the screw is a nut 29, having a flange 30, adapted to be engaged by a screw 31 at each end of the sleeve 25. Two brackets and screws 31 and 32 are provided to enable the screw 26 and nut 29 to be shifted from one end to the other of the sleeve. The screws 31 serve to hold the nut 29 to turn at the ends of the sleeve. Arranged to swing on the nut 29 is a forked block 33, between the limbs of which are arranged ratchet-teeth 34, formed on the nut. Coacting with the ratchet-teeth is a pawl 35, attached to the block 33. Said block is provided with a socket 36, in which an arm 37 is loosely fitted. Said arm has a pin 38 arranged to move in an arc-shaped slot 39 in said socket-piece 36. This allows the rod 37 a limited turning movement in the socket, the purpose of which will be hereinafter fully set forth. Said rod 37 also carries a pin 40, projecting therefrom and having a wire 41 attached to it. Said wire is also attached, by means of an adjusting-screw 42, to an arm 43, attached to the free end of the rod 37. The arm 43 serves not only as a holder for the adjacent end of the rod 37, but also as a handle to facilitate the operation of the device. It will be observed that by swinging the rod 37 around the axis of the screw 26 a step-by-step turning movement will be imparted to the nut 29, and this nut will draw down the screw 26, bringing with it the parts 27, 28, and 29, and thereby forcing the butter out from the receptacle. Simultaneous with this swinging movement of the rod 37 and the forcing out of the butter the wire 41 is intended to sweep under the lower end of the receptacle past the wires 16, cutting off the butter in small cakes. When the bar 37 is swung in one direction, the arm 43 and said rod 37 should be turned in the socket-piece 36, so as to properly engage the wire 41 with the wires 16, and when the rod 37 and its attached parts are returned the handle 43 should be rocked back so as to disengage the wire from the receptacle. Therefore when the rod 37 moves in one direction it cuts the butter into cakes, and when it moves in the other direction it forces the butter out through the wires and returns in position to make a second cut.

Various changes in the form, proportions, and minor details of my invention may be resorted to at will without departing from the spirit and scope thereof. Hence I consider myself entitled to all such variations as may lie within the terms of my claims.

Having thus described the preferred form of my invention, what I claim as new, and desire to secure by Letters Patent, is—

1. In an apparatus for cutting plastic material, the combination of a receptacle, means at one end thereof for dividing the plastic material into sticks, a follower operating in the receptacle, a screw having connection with the follower, a nut engaged with the screw and with a relatively stationary part, an arm attached to the nut, and a cutting-wire carried by the arm and adapted to move past the discharge end of the receptacle.

2. In an apparatus for cutting plastic material, the combination of a receptacle forming a body, means at one end thereof for dividing the plastic material into sticks, a follower operating in the receptacle, a screw connected with the follower, a nut engaged with the screw and with a relatively stationary part, an arm having a pawl-and-ratchet connection with the nut and a cutter carried by the arm and moving past the discharge end of the receptacle for the purpose specified.

3. In an apparatus for cutting plastic material, the combination of a receptacle, means at one end for dividing the plastic material into sticks, a follower in the receptacle, a tubular guide, a screw in the guide and having one end operatively connected with the follower, a nut on the screw and in engagement with the guide, said nut being provided with ratchet-teeth, a member mounted to swing on the nut, a pawl carried by said member and engaging the ratchet-teeth of the nut, an arm mounted to turn the said member, and a cutting-wire carried by the arm.

4. In a machine for cutting plastic material, the combination of a receptacle having an open end and provided at said end with flanges having notches therein, crossing wires set in said notches, means for holding and adjusting the tension of the wires, means for forcing the plastic material through the receptacle, and a cutter working at the outer side of the crossing wires.

5. In a machine for cutting plastic material, the combination of a receptacle having an open end and provided with a plurality of flanges, crossing wires at said open end for the purpose specified, bars movably mounted in the flanges of the receptacle and connected with the wires, means for operating the bars, to adjust the tension of the wires, means for forcing the plastic material through the receptacle, and a cutter operating at the outer side of the wires.

6. In a machine for cutting plastic material, the combination of a receptacle adapted to contain the material, a follower movable therein, a screw having connection with the follower, a nut coacting with the screw, a pawl-and-ratchet device for imparting a step-by-step movement to the nut, and a cutter having connection with the pawl-and-ratchet device to be operated in unison therewith.

7. A machine for cutting plastic material, comprising a receptacle having an open end, means for forcing the plastic material from said end of the receptacle, a rod mounted to swing and to rock past the discharge end of the receptacle, and a cutter carried by said rod.

8. In a machine for cutting plastic material, the combination with a receptacle having means at one end for dividing the plastic material into sticks, and a follower in the receptacle, of a tubular guide, a screw in the guide and having one end operatively connected with the follower, a nut on the screw, means for detachably connecting the nut with the guide so as to turn on said guide, an arm connected with the nut to turn the same, and a cutter carried by said arm.

9. In a machine for cutting plastic material, a receptacle having means at one end for dividing the plastic material into sticks, a follower in the receptacle, a sleeve held adjacent to the receptacle, a screw in the sleeve and having one end connected with the follower, a nut on the screw and having ratchet-teeth thereon, a forked block mounted to turn on the nut and provided with a socket, a pawl carried by the block and engaging the ratchet-teeth of the nut, an arm having limited turning movement in the socket of the said block, and a cutting-wire carried by the arm.

In testimony whereof I have signed my name to this specification in the presence of two subscribing witnesses.

WILLIAM NIEBUR, JR.

Witnesses:
   ISAAC B. OWENS,
   JNO. M. RITTER.